United States Patent Office 3,584,017
Patented June 8, 1971

3,584,017
17α-ACYLOXY - 6 - (OPTIONALLY SUBSTITUTED) AMINOMETHYL - 3β-HYDROXYPREGN-5-EN-20-ONES, ETHERS AND ESTERS THEREOF
Leonard N. Nysted, Highland Park, Ill., assignor to G. D. Searle & Co., Chicago, Ill.
No Drawing. Filed Sept. 3, 1969, Ser. No. 855,012
Int. Cl. C07c 169/32
U.S. Cl. 260—397.4
7 Claims

ABSTRACT OF THE DISCLOSURE

17α-acyloxy-6-(optionally substituted)aminomethyl-3β-hydroxypregn-5-en-20-ones, ethers and esters thereof, possessing valuable pharmacological properties, e.g. analgesic, are prepared by a two-step process involving bromination of the corresponding 5α - hydroxy-6-methylene starting materials followed by reaction of the resulting 6-bromomethyl-Δ$^5$ intermediates with ammonia or an amine.

The present invention is concerned with novel steroidal derivatives possessing a 6-(optionally substituted)aminomethyl-Δ$^5$ structure and, more particularly, with 17α-acyloxy-6-(optionally substituted)amino-3β-hydroxy-pregn-5-en-20-ones, ethers and esters thereof represented by the following structural formula

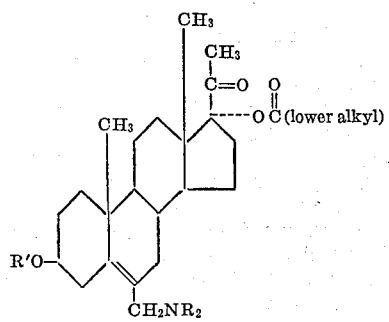

wherein R' is hydrogen or a lower alkyl or lower alkanoyl radical and —NR$_2$ is an amino, alkylamino, dialkylamino or heterocycloaliphatic amino radical.

The lower alkyl radicals encompassed by the foregoing structural formula are typified by methyl, ethyl, propyl, butyl, pentyl, hexyl, heptyl and the branched-chain groups isomeric therewith.

Illustrative of the lower alkanoyl radicals shown in that formula are formyl, acetyl, propionyl, butyryl, valeryl, caproyl, heptanoyl and the corresponding branched-chain radicals.

The heterocycloaliphatic amino radicals comprehended in that formula are exemplified by pyrrolidino, piperidino, morpholino, piperazino and N-alkylpiperazino, e.g. N-methylpiperazino.

The compounds of this invention are conveniently manufactured by a process which utilizes as starting materials 5α-hydroxy-6-methylene compounds represented by the following structural formula

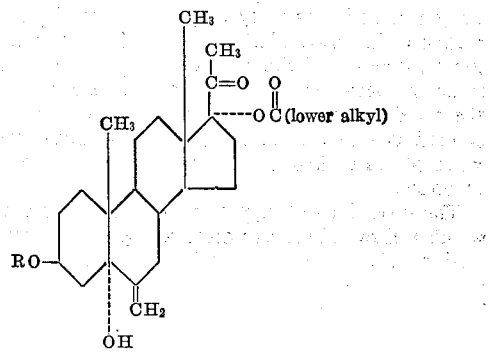

wherein R is as hereinbefore defined. Reaction of those allylic alcohols with a suitable brominating agent results in the corresponding 6-bromomethyl-Δ$^5$ intermediates of the following structural formula

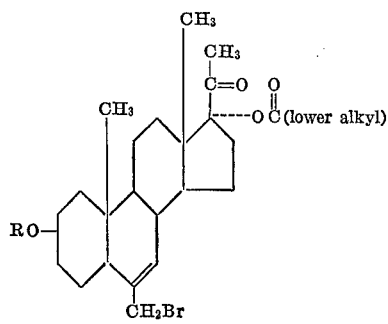

R having the identical meaning as hereinbefore indicated. A specific illustration of that procedure is the reaction of 17α - acetoxy-3β-ethoxy-5α-hydroxy-6-methylene-pregnan-20-one with phosphorous tribromide in toluene to afford 17α-acetoxy-6-bromomethyl-3β-ethoxypregn-5-en-20-one. Reaction of those intermediates with ammonia or the appropriate amine affords the compounds of this invention. The aforementioned 17α-acetoxy-6-bromomethyl-3β-ethoxypregn-5-en-20-one, for example, is contacted with diethylamine in benzene to afford 17α-acetoxy - 3β - ethoxy-6-diethylaminomethyl-pregn-5-en-20-one.

For the purposes of the present invention the acid-addition and quaternary salts are equivalent to the instant amines. These salts are prepared in the usual manner and are typified by the hydrochloride, hydrobromide, sulfate, nitrate, phosphate, lactate, ascorbate, oxalate, succinate, maleate, tartrate, citrate, methochloride, methobromide, methiodide, methosulfate, ethiodide, and ethosulfate. A specific illustration of the preparation of a quaternary salt is the reaction of 17α - acetoxy-3β-hydroxy-6-dimethyl-aminomethylpregn-5-en-20-one with methyl bromide in methyl ethyl ketone at room temperature to afford 17α-acetoxy - 3β-hydroxy-6-dimethylaminomethylpregn-5-en-20-one methobromide.

The compounds of this invention display valuable pharmacological properties. They are, for example, analgesic agents.

The analgesic property of the instant compounds is specifically illustrated by the activity of 3β,17α-diacetoxy-6-diethylaminomethylpregn - 5 - en-20-one acetate, 17α- acetoxy-6-diethylaminomethyl - 3β - hydroxypregn-5-en-20-one and 17α-acetoxy-3β-ethoxy-6-diethylaminomethylpregn-5-en-20-one hydrochloride when assayed by a modification of the procedure described by Bianchi and Franceschini, Brit. J. Pharmacol., 9, 280 (1954). The details of that assay are as follows:

A group of 18–25 g. adult male mice is chosen on the basis of their sensitivity to a clip attached to the base of the tail. The time required for each animal to turn and bite at the clip is recorded and, 30 minutes later, there is administered intraperitoneally to each animal the selected dose of the test compound. A dose of 50 mg./kg. of body weight is normally employed. The clip is again attached at intervals of 30, 60, 90 and 120 minutes following treatment and the response to placement of the clip is again measured. If the animal takes more than twice the pre-drug time to bite at the clip, the response is considered positive. A test compound is considered active when at least 50% of the animals used show a positive response.

The invention will appear more fully from the example which follow. These examples are given by way of illustration only and are not to be construed as limiting the invention either in spirit or in scope as many modifications both in materials and methods will be apparent to those skilled in the art. In these examples temperatures are given in degrees centigrade (° C.) and quantities of materials in parts by weight unless otherwise noted.

EXAMPLE 1

To a solution of 50 parts of 17α-acetoxy-3β-hydroxypregn-5-en-20-one in 200 parts of pyridine is added, with stirring at —10°, 75 parts of p-toluenesulfonyl chloride. Stirring is continued while the reaction mixture is allowed to warm slowly to room temperature. After stirring at room temperature for about 30 minutes, approximately 500 parts of ice is added and the mixture is stirred in order to effect separation of the product. The oily product which separates crystallizes upon standing, then is collected by filtration, washed with water on the filter and dried. The product thus obtained, i.e. 17α-acetoxy-3β-p-toluenesulfonyloxypregn-5-en-20-one, exhibits an ultraviolet absorption maximum at about 224 millimicrons with a molecular extinction coefficient of about 13,500. In addition it displays infrared absorption peaks at about 5.75 and 5.83 microns.

A solution containing 72 parts of 17α-acetoxy-3β-p-toluenesulfonyloxypregn-5-en-20-one in 576 parts of absolute ethanol is heated at the reflux temperature for about 90 minutes, then, while hot, is slowly diluted with water to the point of crystallization. The reaction mixture is cooled to effect completion of crystallization and the resulting solid product is collected by filtration, washed with aqueous ethanol and dried, thus affording 17α-acetoxy-3β-ethoxypregn-5-en-20-one, obtained as white crystals, which exhibit infrared absorption peaks at about 5.72 and 7.9 microns.

To a mixture containing 48 parts of 17α-acetoxy-3β-ethoxypregn-5-en-20-one, one part of sodium acetate and 211 parts of benzene is added, at 0°, 50 parts by volume of 40% peracetic acid in acetic acid. The resulting reaction mixture is stirred for about 2 hours at approximately —10°, then is allowed to warm to room temperature and stirred for 2 hours longer. At that time the mixture is diluted with an equal volume of hexane, then is washed successively with water, dilute aqueous potassium bicarbonate, dilute aqueous sodium bisulfite and dilute aqueous potassium bicarbonate. That washed solution is dried over anhydrous sodium sulfate, then filtered through diatomaceous earth and concentrated to dryness under reduced pressure, thus affording 17α-acetoxy-5α,6α-epoxy-3β-ethoxypregnan-20-one. This compound exhibits an infrared absorption peak at about 5.72 microns with shoulders at approximately 5.81 and 7.99 microns.

To a suspension of 47 parts of 17α-acetoxy-5α,-6α-epoxy-3β-ethoxypregnan-20-one with 600 parts of acetone is added, with stirring at room temperature, a solution of 32 parts by volume of 60% aqueous perchloric acid in 125 parts of water. The temperature rises slightly during the addition and complete solution results after a few minutes. At the end of that reaction period, 100 parts of water is added and stirring is continued for 10 minutes longer. At that time an additional 100 parts of water is added and stirring is again continued for 45 minutes. A further quantity of 400 parts of water is finally added and the solid which separates is collected by filtration, washed on the filter with hot water and dried under reduced pressure, thus affording 17α-acetoxy-3β-ethoxy-5α,6β-dihydroxypregnan-20-one, which compound exhibits infrared absorption peaks at about 3.1, 5.86 and 7.95 microns.

To a suspension of 40 parts of 17α-acetoxy-3β-ethoxy-5α,6β-dihydroxypregnan-20-one with 640 parts of acetone is added, dropwise over a period of about 5 minutes at 0–5°, 35 parts by volume of a 4 M chromium trioxide in sulfuric acid solution. The resulting reaction mixture is stirred at that temperature for about 25 minutes longer, at the end of which time 20 parts of isopropyl alcohol is added and the mixture is stirred for about 15 minutes. The solids which separate are removed by filtration and the filtrate is diluted with approximately 200 parts of water. From that filtrate the acetone is removed by distillation under reduced pressure. The solid that separates from the resulting aqueous mixture is collected by filtration, washed with water and dried to afford 17α-acetoxy-3β-ethoxy - 5α - hydroxypregnane-6,20-dione. This compound exhibits infrared absorption maxima at about 2.82, 3.05, 5.73, 5.82 and 7.99 microns with a shoulder at 5.76 microns.

To a suspension of 73 parts of zinc in 80 parts of methanol is added with stirring 36 parts by volume of an isopropanolic solution containing 9 parts of hydrogen chloride. The resulting reaction mixture is heated at the reflux temperature for about 5 minutes, at the end of which time the methanol is removed by decantation. The zinc residue is dried under nitrogen at approximately 125–150°, then is cooled and 135 parts of tetrahydrofuran is added. To that mixture is then added with stirring 58 parts of methylene bromide. The resulting reaction mixture is heated at the reflux temperature for about 16 hours, then is cooled to approximately —12° and 28 parts of 17α-acetoxy-3β-ethoxy-5α-hydroxypregnane-6,20-dione is added. The resulting reaction mixture is allowed to warm at room temperature, then is stirred for about 2 hours. At the end of that time, 60 parts of acetic acid diluted with 50 parts of water is added dropwise over a period of about 10 minutes. The resulting mixture is filtered and the tetrahydrofuran is partially removed by distillation on the steam bath. Approximately 1000 parts of water is then added and the solid which separates is collected by filtration, washed with water and dried to yield 17α-acetoxy-3β-ethoxy-5α-hydroxy-6-methylenepregnan-20-one. This compound is characterized by infrared absorption maxima at about 2.85, 5.75, 6.05 and 8.0 microns.

EXAMPLE 2

To a solution of 16 parts of phosphorous tribromide in 86 parts of toluene is added, dropwise over a period of about 10 minutes at —10° with stirring, a solution of 27.5 parts of 17α-acetoxy-3β-ethoxy-5α-hydroxy-6-methylenepregnan-20-one in 130 parts of toluene. The reaction mixture is allowed to warm to room temperature, then is stirred for about 2 hours. It is then washed with ice water and saturated with sodium potassium tartrate. The resulting solution is dried over sodium sulfate, then stripped of solvent under reduced pressure. The resulting residue is dissolved in 132 parts of benzene and 35.6 parts of diethylamine is added. The resulting reaction mixture is warmed on the steam bath for about 30 minutes, then is allowed to cool to room temperature. To that mixture is then added hexane and the resulting precipitate of diethylamine hydrobromide is removed by filtration. To the filtrate is then added approximately 18 parts of acetic acid and the solid which separates is collected by filtration and extracted with water. The aqueous layer is filtered, then is made alkaline by the addition of 10% aqueous potassium bicarbonate. The oil which separates is extracted into pentane and that organic solution is dried over anhydrous sodium sulfate, then filtered. To that solution is then added excess isopropanolic hydrogen chloride. The resulting precipitate is collected by filtration and dried, thus affording 17α - acetoxy-3β-ethoxy-6-diethylaminomethylpregn-5-en-20-one hydrochloride, melting at about 223–225°. This compound exhibits infrared absorption bands at about 2.7–3.0, 3.7–4.1, 5.74 and 7.95 microns and is represented by the following structural formula

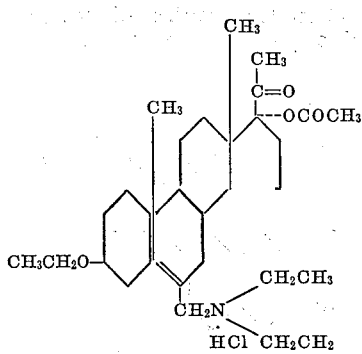

EXAMPLE 3

To a solution of 15 parts of phosphorous tribromide in 130 parts of toluene is added, dropwise over a period of about 10 minutes with a stirring at —10°, a solution of 22.5 parts of 3β,17α-diacetoxy-5α-hydroxy-6-methylenepregnan-20-one in 130 parts of toluene. The reaction mixture is allowed to warm to room temperature, then is stirred for about 2 hours. At the end of that time the solution is decanted from a small amount of insoluble oily material, then is washed with ice water and saturated with sodium potassium tartrate. Drying over anhydrous sodium sulfate followed by removal of the solvent under reduced pressure affords an oily residue. That oil is dissolved in 132 parts of benzene and 14 parts of diethylamine is added. That reaction mixture is warmed on the steam bath for about 30 minutes, then is allowed to stand until cool. The mixture is diluted with hexane and the resulting precipitated diethylamine hydrobromide is removed by filtration. Acetic acid in the amount of 18 parts is added and the solid product which separates is extracted with water. The aqueous layer is filtered, then made basic by the addition of 10% aqueous sodium bicarbonate, resulting in separation of the oily product. That oil is extracted into pentane and the resulting organic solution is dried over anhydrous sodium sulfate, then filtered and 12 parts of acetic acid is added. The oil which initially separates crystallizes upon standing, then is collected by filtration, washed with pentane and dried under reduced pressure, thus affording 3β,17α - diacetoxy - 6 - diethylaminomethylpregn-5-en- 20-one acetate. This compound exhibits nuclear magnetic resonance peaks at about 39, 66, 122, 125, 129, 168, 175, 182, 189 and 211 cycles per second and is characterized by the following structural formula

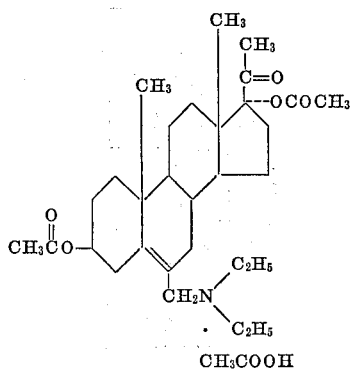

EXAMPLE 4

To a solution of 7.5 parts of 3β,17α-diacetoxy-6-diethylaminomethylpregn-5-en-20-one acetate in 84 parts of methanol is added 7 parts of potassium bicarbonate and the resulting reaction mixture is heated at the reflux temperature with stirring for about 40 minutes. At the end of that time 200 parts of water is added and the resulting precipitated product is collected by filtration, then is dried and dissolved in methylene chloride. The methylene chloride solution is filtered through diatomaceous earth, then is concentrated under reduced pressure to afford an oily residue containing 17α-acetoxy-3β-hydroxy-6-diethylaminomethylpregn-5-en-20-one. To that residue is added approximately 3 parts of acetic acid and that mixture is dissolved in ether. Upon standing crystallization of the product occurs and the crystals are collected by filtration, washed with ether and dried to afford 17α-acetoxy-3β-hydroxy - 6 - diethylaminomethylpregn-5-en-20-one acetate. This compound is characterized by nuclear magnetic resonance peaks at about 38, 68, 120, 123, 128, 169–176, 183–191 and 214 cycles per second and also by the following structural formula

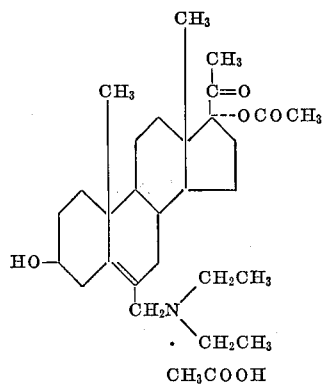

EXAMPLE 5

The substitution of equivalent quantities of 17α-acetoxy - 3β,5α - dihydroxy - 6 - methylenepregnan - 20 - one and dimethylamine in the procedure of Example 2 results in 17α - acetoxy - 3β - hydroxy - 6 - dimethylaminomethylpregn-5-en-20-one.

EXAMPLE 6

To a solution of 10 parts of 17α-acetoxy-3β-hydroxy-6-dimethylaminomethylpregn-5-en-20-one in 40 parts of methyl ethyl ketone is added 10 parts of methyl bromide and the resulting reaction mixture is allowed to stand at room temperature for about 3 hours. The resulting solid precipitate is collected by filtration, washed on the filter with acetone and dried, thus yielding 17α-acetoxy-3β-hydroxy-6-dimethylaminomethylpregn-5-en-20 - one methobromide. This compound is represented by the following structural formula

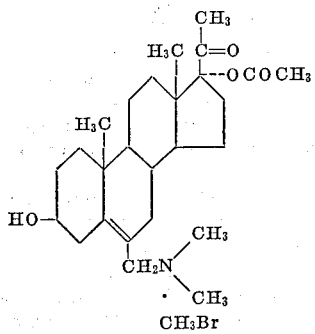

EXAMPLE 7

When an equivalent quantity of 3β-acetoxy-5α-hydroxy-6 - methylene - 17α - propionoxypregnan - 20 - one is substituted in the procedure of Example 3, there is produced 3β - acetoxy - 6 - diethylaminomethyl - 17α - propionoxypregen-5-en-29-one.

EXAMPLE 8

By substituting an equivalent quantity of 17α-acetoxy-5α - hydroxy - 6 - methylene - 3β - propionoxypregnan-20-one and otherwise proceeding according to the processes described in Example 3, there is produced 17α-acetoxy - 6 - diethylaminomethyl - 3β - propionoxypregn - 5-en-20-one.

EXAMPLE 9

The substitution of an equivalent quantity of 17α-acetoxy - 5α - hydroxy - 3β - methoxy - 6 - methylenepregnan-20-one in the procedure of Example 2 results in 17α-acetoxy - 6 - diethylaminomethyl - 3β - methoxypregn - 5 - en-20-one.

EXAMPLE 10

The reaction of equivalent quantities of 17α-acetoxy-3β - hydroxy - 6 - diethylaminomethylpregn - 5 - en - 20-one and ethyl bromide according to the procedure of Example 6 results in 17α-acetoxy-3β-hydroxy-6-diethylaminomethylpregn-5-en-20-one ethobromide.

What is claimed is:
1. A member selected from the group consisting of compounds of the formula

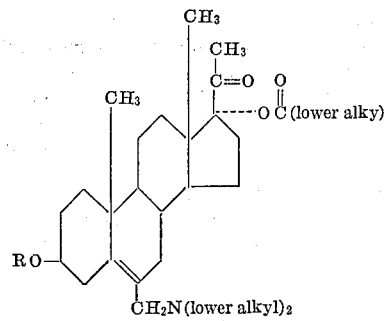

wherein R is a member of the class consisting of hydrogen, a lower alkanoyl and a lower alkyl radical, and the non-toxic acid-addition and quaternary salts thereof.

2. As in claim 1, a member selected from the group consisting of compounds of the formula

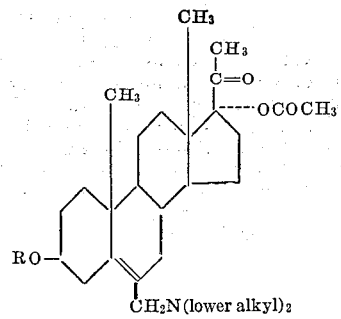

wherein R is a member of the class consisting of hydrogen, a lower alkanoyl and a lower alkyl radical, and the non-toxic acid-addition and quaternary salts thereof.

3. As in claim 1, a member selected from the group consisting of compounds of the formula

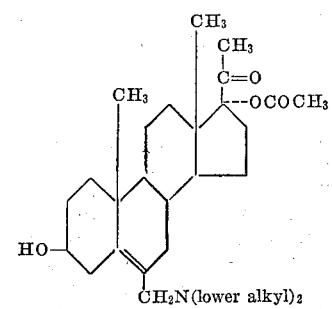

and the non-toxic acid-addition and quaternary salts thereof.

4. As in claim 1, the compound which is 17α-acetoxy-6 - diethylaminomethyl - 3β - hydroxypregn - 5 - en - 20-one.

5. As in claim 1, the compound which is 17α-acetoxy-3β - hydroxy - 6 - dimethylaminomethylpregn - 5 - en - 20-one methobromide.

6. As in claim 1, the compound which is 3β,17α-diacetoxy-6-diethylaminomethylpregn-5-en-20-one acetate.

7. As in claim 1, the compound which is 17α-acetoxy-3β - ethoxy - 6 - diethylaminomethylpregn - 5 - en - 20-one hydrochloride.

References Cited

UNITED STATES PATENTS 3,084,159    4/1963    Kirk et al. _____ 260—239.55

ELBERT L. ROBERTS, Primary Examiner

E. G. LOVE, Assistant Examiner

U.S. Cl. X.R.

260—239.5, 239.55; 424—238